Dec. 27, 1955
T. W. SCOTT
2,728,605
IRRIGATION SPRINKLER LINE
Filed June 26, 1953
2 Sheets-Sheet 2
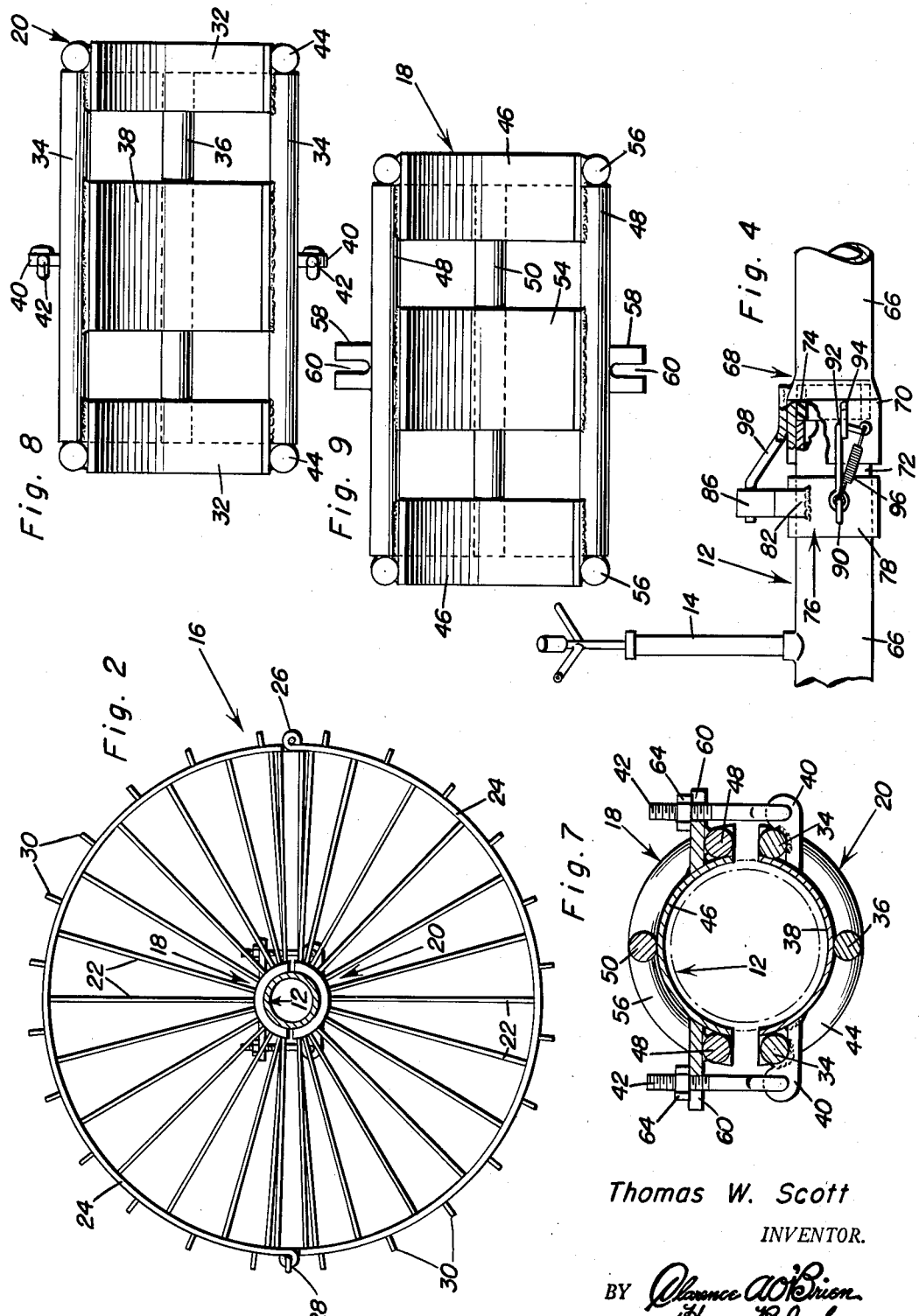
Thomas W. Scott
INVENTOR.

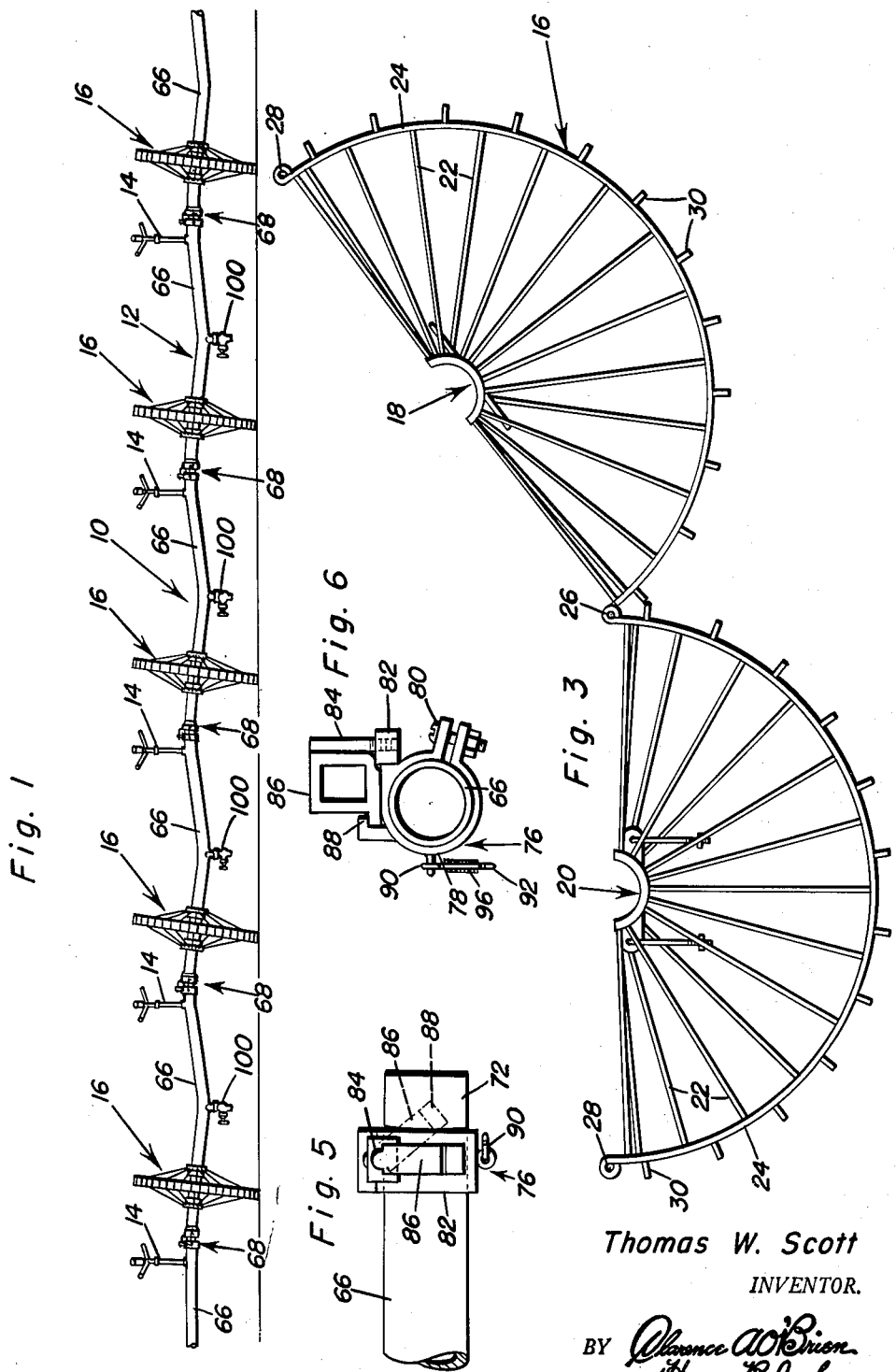

United States Patent Office 2,728,605
Patented Dec. 27, 1955

2,728,605

IRRIGATION SPRINKLER LINE

Thomas W. Scott, Gordon, Nebr.

Application June 26, 1953, Serial No. 364,399

3 Claims. (Cl. 299—47)

This invention relates in general to improvements in sprinkler equipment, and more specifically, to an improved irrigation sprinkler line.

In many parts of the country crops are irrigated by the use of sprinklers. In order to properly sprinkle all of the land it is necessary to either have an elaborate sprinkler arrangement or to have a portable sprinkler system. While a portable sprinkler system would be more economical than an elaborate sprinkler system, there has not been devised a suitable portable sprinkler system which may be conveniently moved over the land to be irrigated.

It is, therefore, the primary object of this invention to provide an improved irrigation sprinkler line which may be conveniently moved over the land to be irrigated by merely rolling the same progressively over the land so that the land may be progressively irrigated.

Another object of this invention is to provide an improved wheel which may be quickly and conveniently connected to an irrigation line, the wheel being formed of split halves hingedly connected together whereby the same may be quickly and easily clamped on a sprinkler line.

Another object of this invention is to provide an improved irrigation sprinkler line which is of a relatively simple construction and formed of readily obtainable materials so as to be economically feasible and at the same time is of an extremely simple construction so that the same may be quickly and easily moved over the land being irrigated.

A further object of this invention is to provide an improved coupling lock for sections of the irrigation line mounted for rotation, the coupling lock preventing rotation of coupling halves so that the irrigation line may be conveniently rotated to desired positions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view of the irrigation sprinkler line which is the subject of this invention, the ends of the line being omitted;

Figure 2 is an enlarged side elevational view of the wheels supporting the sprinkler line to facilitate portability of the same;

Figure 3 is a side elevational view similar to Figure 2 and shows the wheel of Figure 2 in its open position for reception of the sprinkler line;

Figure 4 is an enlarged fragmentary side elevational view of an intermediate portion of the elongated conduit forming the water-carrying portion of the sprinkler line and shows the general construction of a coupling between sections thereof, portions of the coupling being broken away and shown in section;

Figure 5 is a top plane view of one-half of the coupling, a pivotal keeper element having an alternate position shown in dotted lines;

Figure 6 is an end elevational view of the half of the coupling and shows the general appearance of the keeper element;

Figure 7 is an enlarged transverse sectional view taken through the hub portion of the wheel of Figure 2 and shows the manner in which halves thereof are clamped together;

Figure 8 is an enlarged elevational view of one half of the hub of the wheel of Figure 2; and, Figure 9 is an enlarged elevational view of the other hub half.

Referring now to Figures 2 and 3 in particular, it will be seen that the wheel 14 includes a split hub having halves line which is the subject of this invention, the sprinkler line being referred to in general by the reference numeral 10. The irrigation sprinkler line 10 includes an elongated conduit 12 which has mounted thereon a spaced intervals conventional sprinklers 14. In order that the conduit 14 may be conveniently moved from one place to another, the conduit has mounted thereon at spaced intervals wheels which are referred to in general by the reference numeral 16, the wheels facilitating the rotation of the entire sprinkler line 10 to another position on the field to be irrigated. While there has not been illustrated the same, a field to be irrigated will be provided with a sprinkler supply line to which the conduit 12 may be connected for receiving water to be used in the irrigation of a field.

Referring now to Figures 2 and 3 in particular, it will be seen that the wheel 14 includes a split hub having halves 18 and 20. The halves 18 and 20 have radiating therefrom spokes 22 which are connected to rim halves 24. The rim halves 24 have first abutting ends pivotly connected together by hinge 26. The other abutting ends of the rim halves 24 are releasably connected together by suitable latch means 28. The rim halves 24 are provided with ground engaging lugs 30 at circumferentially spaced intervals to facilitate the simultaneous rotation of all of the wheels 16.

Referring now to Figure 8 in particular, it will be seen that the hub halves 20 include a pair of relatively narrow U-shaped end members 32 which are connected together adjacent to ends by longitudinally extending rods 34. The U-shaped end members 32 are also connected together at their mid-points by an elongated rod 36.

Disposed between the U-shaped end members 32 in spaced relation therewith is an enlarged, relatively wide U-shaped intermediate member 38 which is maintained in position by being secured to the rods 34 and 36 intermediate their ends.

Carried by the intermediate member 38 and extending upwardly therefrom is a pair of oppositely directed eyes 40 which have pivotly connected thereto elongated threaded fasteners 42.

The end members 32 are provided adjacent to ends with U-shaped rods 44 which are secured to the other faces thereof. The U-shaped rods 44 abut the ends of the rods 44 and 36 and have secured thereto spokes 22 which are associated with the hub half 20.

Referring now to Figure 9 in particular, it will be seen that the hub half 18 is quite similar to the hub half 20 inasmuch as it includes a pair of narrow, U-shaped end members 46 which are connected together by longitudinally extending rods 48 secured to end portions of the end members 46. The end members 46 are also connected together intermediate their ends by a longitudinally extending rod 50. Disposed between the end members 46 is a relatively wide U-shaped intermediate member 54. The intermediate member 54 is maintain in spaced relation with respect to the end members 46 by securement of the same to the rods 48 and 50. The end members 46 are also provided with U-shaped rods 56 secured to the outer surfaces thereof for securement to the spokes 22 associated with the hub half 18.

The hub half 18 differs from the hub half 20 inasmuch as the intermediate member 56 is provided with oppositely disposed outwardly extending ears 58 which have bifurcated end portions forming elongated open ended slots 60.

Referring now to Figure 7 in particular, it will be seen that the hub halves 18 and 20 are clamped together by the fasteners 42 which have their intermediate portions disposed in these slots 60 and have nuts 64 threadedly engaged thereon to facilitate clamping of the hub half 18 towards the hub half 20 whereby the hub halves may be conveniently clamped on the conduit 12 at selected points thereon.

It will be seen that the conduit 12 is formed in a plurality of sections 66 which are connected together by suitable coupling 68. The coupling 68 may be of any conventional type and should preferably include a male coupling member 70 carried by one of the sections 66 which has received therein a female portion 72 of adjacent section 66, the section between the male coupling half 70 and the female portion 72 being sealed by a resilient sealing ring 74.

Referring now to Figures 4, 5, and 6, seen that the conduit section 66 is provided adjacent the female portion 72 with a keeper which is referred to in general by the reference numeral 76. The keeper 76 includes a split strap portion 78 having a fastener 80 to facilitate the clamping thereof onto the conduit section 66. Carried by the split strap portion 78 is a mounting block 82 which has pivotally connected thereto by a fastener 84 a rectangular hollow keeper member 86. The keeper member 86 is provided with a locking portion 88 engageable with the mounting block 82.

Also carried by the strap portion 78 of the keeper 76 is an eye 90 to which is pivotly connected an L-shaped latch member 92. The latch member 92 is selectively engageable in an eye 94 carried by the male coupling 70 to pull the male coupling 70 towards the female portion 72 and retain the same in interfitting relation therewith with the resilient packing ring 74 being compressed to form a seal. In order to assure the retention of the male coupling half 70 and the female portion 72 in proper relation, the free end of the L-shaped latch 92 has connected thereto a tension spring 96 whose opposite end is connected to that end of the latch 92 connected to the eye 90.

Carried by the male coupling half 70 is a generally Z-shaped latch element 98. The Z-shaped latch element 98 has a free end disposed in the opening in the keeper member 86. When the free end of the latch element 98 is disposed in the opening of the keeper member 86, the male coupling half 70 is prevented from rotating with respect to the female portion 72 to which it is connected so that the conduit sections 66 may not rotate with respect to each other during movement of the irrigation line 10 from one position to another. It will be understood that the keeper member 86 is pivotly connected to its mounting block 82 to facilitate engagement of the latch element 98 in the opening therethrough.

Referring to Figure 1 in particular, it will be seen that each of the conduit sections 66 is provided with one of the wheels 16 and one of the sprinklers 14. Also, each of the conduit sections 66 is provided at its mid-point with depending drain valve which facilitates the draining of the conduit section when the irrigation sprinkler line 10 is not in use.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a sprinkler line, a conduit section, a ground wheel for supporting the conduit section divided into half rim sections and half hub sections connected to the rim sections and engageable with opposite sides of the conduit sections, interfitting ends on the half rim sections pivoted together for swinging of said half rim sections toward each other to engage the half hub sections with the conduit section, and clamping means on the half hub sections for clampingly engaging the same with the conduit section for rotation of the conduit section by said wheel, said hub section comprising pairs of U-shaped end members and a pair of U-shaped intermediate members spaced from the pairs of end members, and cross rods connecting the end and intermediate members of the pairs.

2. In a sprinkler line, a conduit section, a ground wheel for supporting the conduit section divided into half rim sections and half hub sections connected to the half rim sections and engageable with opposite sides of the conduit sections, interfitting ends on the half rim sections pivoted together for swinging of said half rim sections toward each other to engage the half hub sections with the conduit section, and clamping means on the half hub sections for clampingly engaging the same with the conduit section for rotation of the conduit section by said wheel, said hub sections comprising pairs of U-shaped end members, said clamping means comprising a pair of U-shaped clamping members intermediate and spaced from the pairs of end members and provided with bolts for clampingly engaging the same with said conduit section, and cross rods connecting the end and clamping members of the pairs.

3. In a sprinkler line, a plurality of conduit sections having contiguous ends telescoping to communicate the conduit sections, a ground wheel for supporting each conduit section divided into half rim sections and half hub sections connected to the half rim sections and engageable with opposite sides of the conduit section, interfitting ends on the half rim sections pivoted together for swinging of said half rim sections toward each other to engage the half hub sections with the conduit, clamping means on the half hub sections for clampingly engaging the same with the conduit section for rotation of the conduit section by said wheel, and clamping means connecting the contiguous ends of the conduit sections together against relative rotation, said last named clamping means comprising a clamp on one of the contiguous ends, a rigid latch finger on the other contiguous end, and a hollow keeper pivoted on the clamp and swingable over the finger.

References Cited in the file of this patent

UNITED STATES PATENTS

| 277,910 | Lilley | May 22, 1883 |
| 2,516,711 | Mansur | July 25, 1950 |
| 2,665,169 | Tipton | Jan. 5, 1954 |
| 2,665,941 | Idler | Jan. 12, 1954 |
| 2,702,717 | Cornelius | Feb. 22, 1955 |